United States Patent
Erceg et al.

(10) Patent No.: US 10,681,771 B2
(45) Date of Patent: Jun. 9, 2020

(54) UNIFIED MEDIA ACCESS CONTROL (MAC) FOR MULTIPLE PHYSICAL LAYER DEVICES

(71) Applicant: Avago Technologies International Sales Pte. Limited, Singapore (SG)

(72) Inventors: Vinko Erceg, San Diego, CA (US); Mark Gonikberg, Sunnyvale, CA (US); Rohit Gaikwad, San Diego, CA (US); Hongyu Xie, San Diego, CA (US); Anand Iyer, Sunnyvale, CA (US); Venkat Kodavati, Sunnyvale, CA (US); Tirdad Sowlati, Irvine, CA (US); Payam Torab Jahromi, Laguna Niguel, CA (US); Matthew J. Fischer, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/289,470

(22) Filed: Feb. 28, 2019

(65) Prior Publication Data
US 2019/0200415 A1 Jun. 27, 2019

Related U.S. Application Data

(63) Continuation of application No. 15/604,576, filed on May 24, 2017, now Pat. No. 10,270,717.
(Continued)

(51) Int. Cl.
*H04W 84/12* (2009.01)
*H04L 1/18* (2006.01)
(Continued)

(52) U.S. Cl.
CPC .......... *H04W 84/12* (2013.01); *H04L 1/0001* (2013.01); *H04L 1/1825* (2013.01);
(Continued)

(58) Field of Classification Search
CPC ....... H04W 84/12; H04J 3/1694; H04L 65/80; H04L 69/22
See application file for complete search history.

(56) References Cited

U.S. PATENT DOCUMENTS

| | | | |
|---|---|---|---|
| 8,023,530 B1* | 9/2011 | Giallorenzi | H04W 52/0222 370/469 |
| 2004/0064592 A1* | 4/2004 | Ishidoshiro | H04W 28/22 709/250 |

(Continued)

*Primary Examiner* — Duc C Ho
(74) *Attorney, Agent, or Firm* — Morgan, Lewis & Bockius LLP

(57) ABSTRACT

A device implementing unified media access control (MAC) for multiple physical layer devices may include at least one processor communicatively coupled to first and second physical layer modules that are configured to communicate with another device over first and second wireless channels, respectively. The at least one processor may be configured to receive one or more data items to be transmitted to the another device and to select at least one of the first or second physical layer modules for transmission of the one or more data items based at least in part on a first condition of the first physical wireless channel and a condition of the second physical wireless channel. The at least one processor may be further configured to provide the one or more data items to the selected at least one of the first or second physical layer modules for transmission to the another device.

20 Claims, 7 Drawing Sheets

Related U.S. Application Data

(60) Provisional application No. 62/470,163, filed on Mar. 10, 2017.

(51) Int. Cl.

| | | |
|---|---|---|
| *H04W 80/02* | (2009.01) | |
| *H04L 1/00* | (2006.01) | |
| *H04L 12/28* | (2006.01) | |
| *H04L 12/861* | (2013.01) | |
| *H04L 29/06* | (2006.01) | |
| *H04W 84/18* | (2009.01) | |
| *H04J 3/16* | (2006.01) | |

(52) U.S. Cl.
CPC ........ *H04L 1/1867* (2013.01); *H04L 12/2832* (2013.01); *H04L 49/9068* (2013.01); *H04W 80/02* (2013.01); *H04J 3/1694* (2013.01); *H04L 65/4076* (2013.01); *H04L 65/80* (2013.01); *H04L 69/22* (2013.01); *H04W 84/18* (2013.01)

(56) References Cited

U.S. PATENT DOCUMENTS

| | | | |
|---|---|---|---|
| 2007/0195764 A1 | 8/2007 | Liu | |
| 2009/0080366 A1* | 3/2009 | Shao | H04B 7/15542 370/315 |
| 2010/0091759 A1 | 4/2010 | Stahl | |
| 2010/0202392 A1 | 8/2010 | Zhang | |
| 2012/0243475 A1* | 9/2012 | Yen | H04L 12/6418 370/328 |
| 2013/0028247 A1* | 1/2013 | Li | H04L 45/24 370/338 |
| 2014/0056243 A1 | 2/2014 | Pelletier | |
| 2016/0094369 A1* | 3/2016 | Chuyen | H04L 45/74 370/293 |

\* cited by examiner

UNIFIED MEDIA ACCESS CONTROL (MAC) FOR MULTIPLE PHYSICAL LAYER DEVICES

CROSS-REFERENCE TO RELATED APPLICATIONS

The present application is a continuation of U.S. patent application Ser. No. 15/604,576, entitled "Unified Multi-Layer Media Access Control (MAC) for Multiple Physical Layer Devices," filed on May 24, 2017, which claims the benefit of U.S. Provisional Patent Application Ser. No. 62/470,163, entitled "Unified Multi-Layer Media Access Control (MAC) for Multiple Physical Layer Devices," filed on Mar. 10, 2017, the disclosure of each of which are hereby incorporated by reference in its entirety for all purposes.

TECHNICAL FIELD

The present description relates generally to media access control for multiple physical layer devices, including unified media access control (MAC) for multiple physical layer devices (PHYs).

BACKGROUND

Wireless devices may utilize one or more different wireless technologies to communicate over one or more frequency bands, such as 2.4 gigahertz (GHz), 5 GHz 60 GHz, etc. The different wireless technologies may be associated with different channel specific functions, such as channel access, link maintenance, and the like.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system, a unified MAC module is provided for controlling multiple different PHYs, such as for controlling concurrent transmissions over multiple different PHYs. The PHYs may be configured to communicate with a device over corresponding physical channels, such as corresponding physical wireless channels, where each of the PHYs is configured to communicate with the device over a different one of the corresponding physical channels. The unified MAC module receives data for transmission to the device and selects one or more of the PHYs for transmitting the data based at least in part on a quality of the different physical wireless channels corresponding to the PHYs. The quality may be, for example, a wireless link quality of the physical wireless channels, or generally any indication of a quality of the physical wireless channels. The unified MAC module provides the data to the selected one or more PHYs for transmission to the device over the corresponding physical wireless channels.

In one or more implementations, the unified MAC module may include multiple MAC layers. For example, the unified MAC module may include a primary MAC module that coordinates MAC functions that are common across the different PHYs, such as packet assembly, retransmissions, acknowledgments, packet reordering, and the like, and secondary MAC modules that are each associated with a different one of the PHYs. The secondary MAC modules handle channel-specific (and/or PHY-specific) MAC functions for the associated PHY, such as channel access (e.g., using carrier sense multiple access (CSMA)), link maintenance, and the like. In this manner each of the secondary MAC modules can be individually configured to handle the channel-specific (and/or PHY-specific) MAC functions, e.g. functions whose implementations may differ across each of the PHYs, while the primary MAC module can be configured to handle the common MAC functions. Thus, the unified MAC module can be extended, e.g. by adding additional secondary MAC modules, to handle any number of individual PHYs and any type of individual PHYs. Furthermore, utilizing the primary MAC module allows for the common MAC functions across all the PHYs to be unified.

Figure 1:
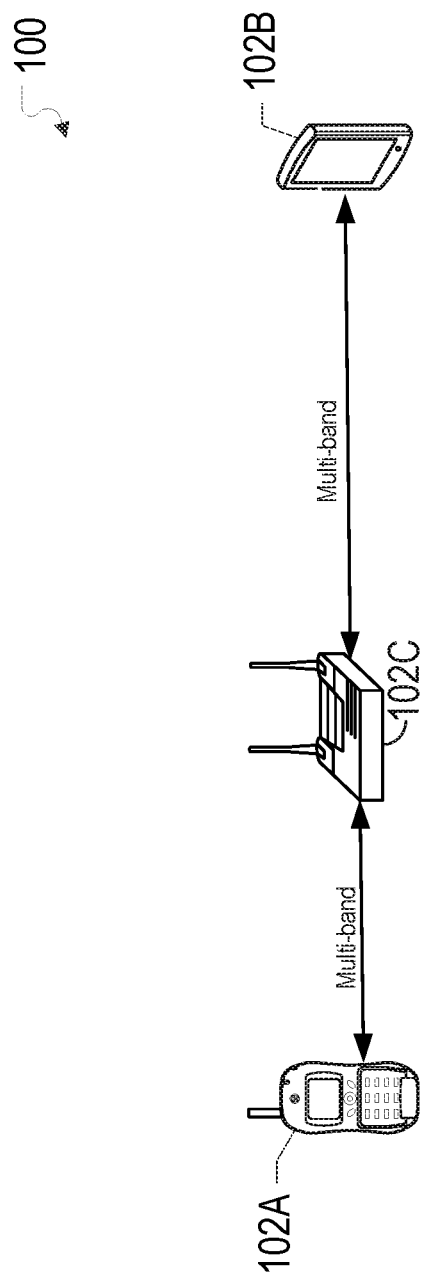
FIG. 1 illustrates an example network environment in which a unified MAC for multiple PHYs may be implemented in accordance with one or more implementations.

FIG. 1 illustrates an example network environment in which a unified MAC for multiple PHYs may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more electronic devices 102A-C. The electronic devices 102A-C may communicate with one another using one or more wireless communication technologies, such as Wi-Fi (e.g. 802.11ac, 802.11ax, etc.), cellular (e.g. 3G, 4G, 5G, etc.), directional multi-gigabit (DMG), and/or mmWave (e.g. 802.11ad, 802.11ay, etc.). The electronic devices 102A-C may communicate with one another using single carrier transmissions and/or multi-carrier transmissions, such as orthogonal frequency-division multiplexing transmissions.

The electronic devices 102A-C may be, for example, base stations, access points, routers, portable computing devices such as laptop computers, smartphones, tablet devices, wearable devices such as a watch, a band, and the like, or any other appropriate device that includes, for example, one or more wireless interfaces. In FIG. 1, by way of example, the electronic device 102A is depicted as a mobile device, the electronic device 102B is depicted as a tablet device, and the electronic device 102C is depicted as a base station. The electronic devices 102A-C may be, and/or may include all or part of, the electronic devices discussed below with respect to FIGS. 2-4, and/or the electronic system discussed below with respect to FIG. 7.

In one or more implementations, one or more of the electronic devices 102A-B may communicate with the electronic device 102C, e.g. a base station or access point, and/or the electronic devices 102A-B may communicate directly with one another using peer-to-peer transmissions, e.g. bypassing the electronic device 102C, and/or independent of coordination from the electronic device 102C. For explanatory purposes, multiple different wireless and wired technologies are described herein. However, the subject system is PHY-independent and can be uniformly implemented across generally any communication technology.

In the subject system, the electronic devices 102A-C may each include a unified MAC module for controlling multiple different PHYs. The unified MAC module allows for each of the electronic devices 102A-C to communicate over multiple different PHYs concurrently. The unified MAC module supports any number/type of concurrent PHYs, such as real simultaneous dual band (RSDB) communications with a 2.4 GHz PHY and a 5 GHz PHY, single in-band communications with two 5 GHz PHYs, an 802.11ax 2.4 GHz PHY and one or more 802.11ad PHYs, and the like.

The unified MAC module may support full duplex, frequency division duplexing (FDD), and/or multiple PHYs per band, such as multiple different 802.11ad PHYs. The unified MAC module supports transmitting/receiving any packets (e.g. data, management, extension, acknowledgements, etc.) by any PHY or by one or more PHYs in any order. The data may be transmitted in chunks or in packets. The unified MAC module further allows for the use of different PHYs for uplink/downlink, transmission/acknowledgment, transmission/retransmission, and the like.

The unified MAC module may select one or more PHYs to use for a given transmission based on one or more parameters, such as link budget (assessed service availability) of the wireless channels corresponding to the PHYs, the amount of data to be transmitted, wireless link quality of the channels corresponding to the PHYs (e.g., RSSI (Received Signal Strength Indication), SINR (Signal-to-Interference-plus-Noise Ratio), PDR (Packet-Delivery Ratio), and/or BER (Bit-Error Rate)), power impact, channel availability, delay, quality of service, and the like. Example unified MAC modules are discussed further below with respect to FIGS. 2-4.

The unified MAC module may select different PHYs for transmissions to different devices, and/or different or the same data may be transmitted over multiple PHYs to the same device. For example, the unified MAC module may select a first PHY for transmission of data from a first data flow and the unified MAC module may select a second PHY for transmission of data from a second data flow. In the instance where data is being transmitted to multiple different devices, the unified MAC module may select the most suitable PHY for each of the different devices, and/or the unified MAC module may broadcast the data to each of the different devices over each of the multiple PHYs concurrently. In one or more implementations, the unified MAC module may select to transmit the same data across multiple PHYs. In this instance, a unified MAC module of the receiving device may combine the data received across the multiple PHYs and may drop the redundant packets, such as by using maximum ratio combining.

In one or more implementations, the unified MAC module may include a primary MAC module that coordinates functions that are common across the PHYs and individual secondary MAC modules associated with each PHY that handle the channel-specific (or PHY-specific) functions for the associated PHY. The primary MAC module may select which secondary MAC module and associated PHY to use for a given transmission, e.g., based on the aforementioned parameters. An example process of a primary MAC module is discussed further below with respect to FIG. 5, and an example process of a secondary MAC module is discussed further below with respect to FIG. 6.

Figure 2:
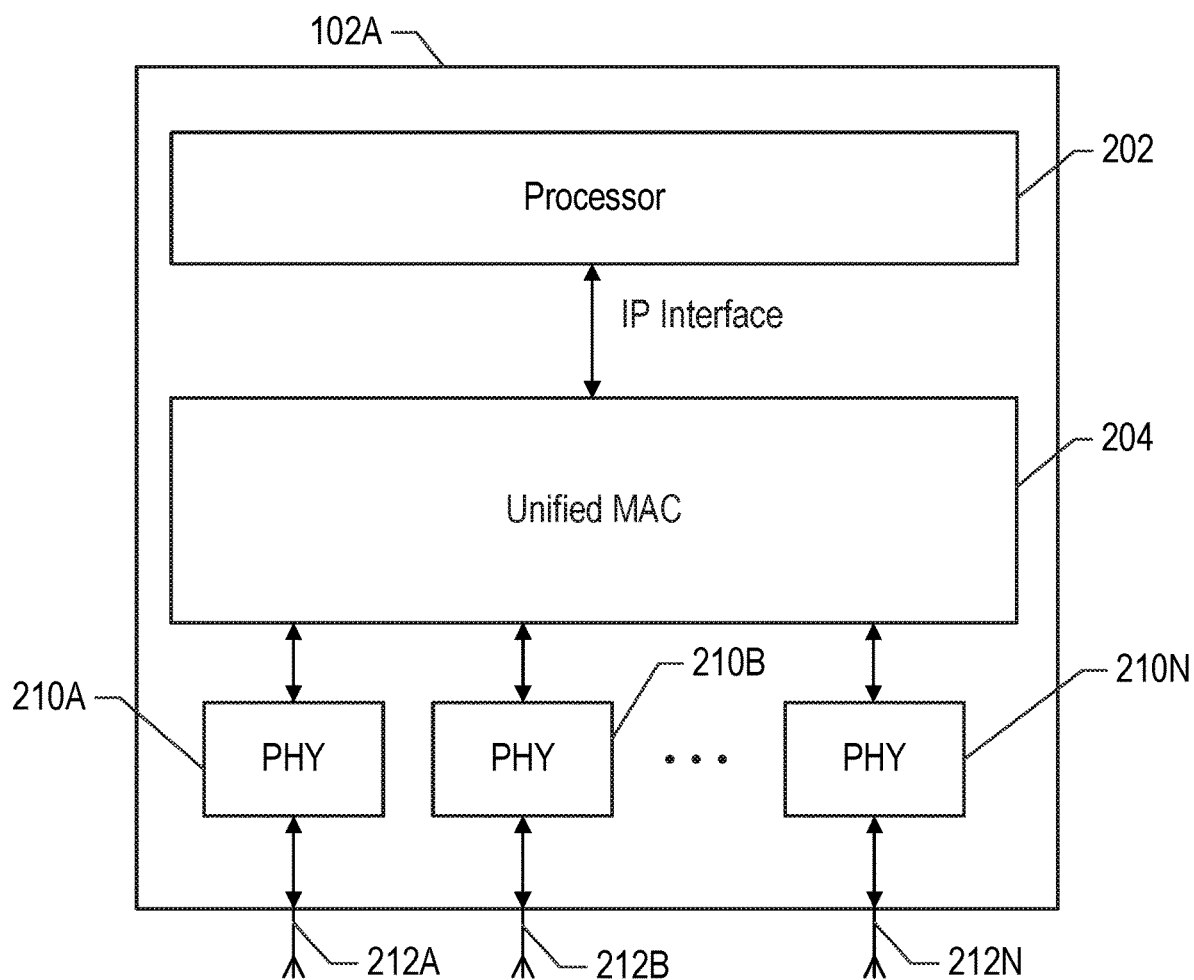
FIG. 2 illustrates an example electronic device implementing a unified MAC for multiple PHYs in accordance with one or more implementations.

FIG. 2 illustrates an example electronic device 102A implementing a unified MAC for multiple PHYs in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include, among other components, a processor 202, a unified MAC module 204, one or more PHYs 210A-N, and one or more antennas 212A-N. The unified MAC module 204 may be communicatively coupled to the processor 202, such as via one or more internet protocol (IP) interfaces. The one or more IP interfaces may be used to communicate one or more data flows between the processor 202 and the unified MAC module 204. In this manner, the inner workings of the unified MAC module 204 and/or the PHYs 210A-N are transparent to the processor 202 and/or applications executing thereon.

The unified MAC module 204 may receive data from the processor 202, select one or more of the PHYs 210A-N for transmitting the data, packetize/process the data, and provide all or part of the packetized/processed data to the selected PHYs 210A-N for transmission over corresponding physical wireless channels. The unified MAC module 204 may also receive data from the PHYs 210A-N, combine/depacketize/process the data, and provide the processed data to the processor 202.

The processor 202, which may also be referred to as an application/host processor, may include suitable logic, circuitry, and/or code that enable processing data and/or controlling operations of the electronic device 102A. In this regard, the processor 202 may be enabled to provide control signals to various other components of the electronic device 102A. The processor 202 may also control transfers of data to/from the electronic device 102A. For example, the processor 202 may provide data items, such as packets, chunks, or a raw or unformatted data stream, to the unified MAC module 204 for transmission by one or more of the PHYs 210A-N, and the processor 202 may receive data items, such as packets, chunks, or a raw or unformatted data stream, from the unified MAC module 204.

The PHYs 210A-N may be physical layer devices (or physical layer modules) for communicating over physical wireless channels on one or more frequency bands, such as 2.4 GHz, 5 GHz, 60 GHz, or generally any frequency band. The PHYs 210A-N may each be separate circuits and/or the PHYs 210A-N may share one or more circuits or components. In one or more implementations, the PHYs 210A-N may share the one or more antennas 212A-N. Each of the PHYs 210A-N may be configured for communication over a physical wireless channel on one of the frequency bands; however, the PHYs 210A-N may be reconfigurable for communication over others of the frequency bands. In one or more implementations, one or more of the PHYs 210A-N may be compliant with one or more specifications, such as 802.11n, 802.11ax, 802.11ad, etc.

In one or more implementations, all or part of the unified MAC module 204 may be implemented on dedicated circuitry and/or all or part of the unified MAC module 204 may be implemented by the processor 202. In one or more implementations, the unified MAC module 204 may be backwards compatible with one or more of 802.11n, 802.11ac, 802.11ax, etc., and the unified MAC module 204 may provide extended functionality.

In one or more implementations, one or more of the processor 202, the unified MAC module 204, the PHYs 210A-N, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 3:
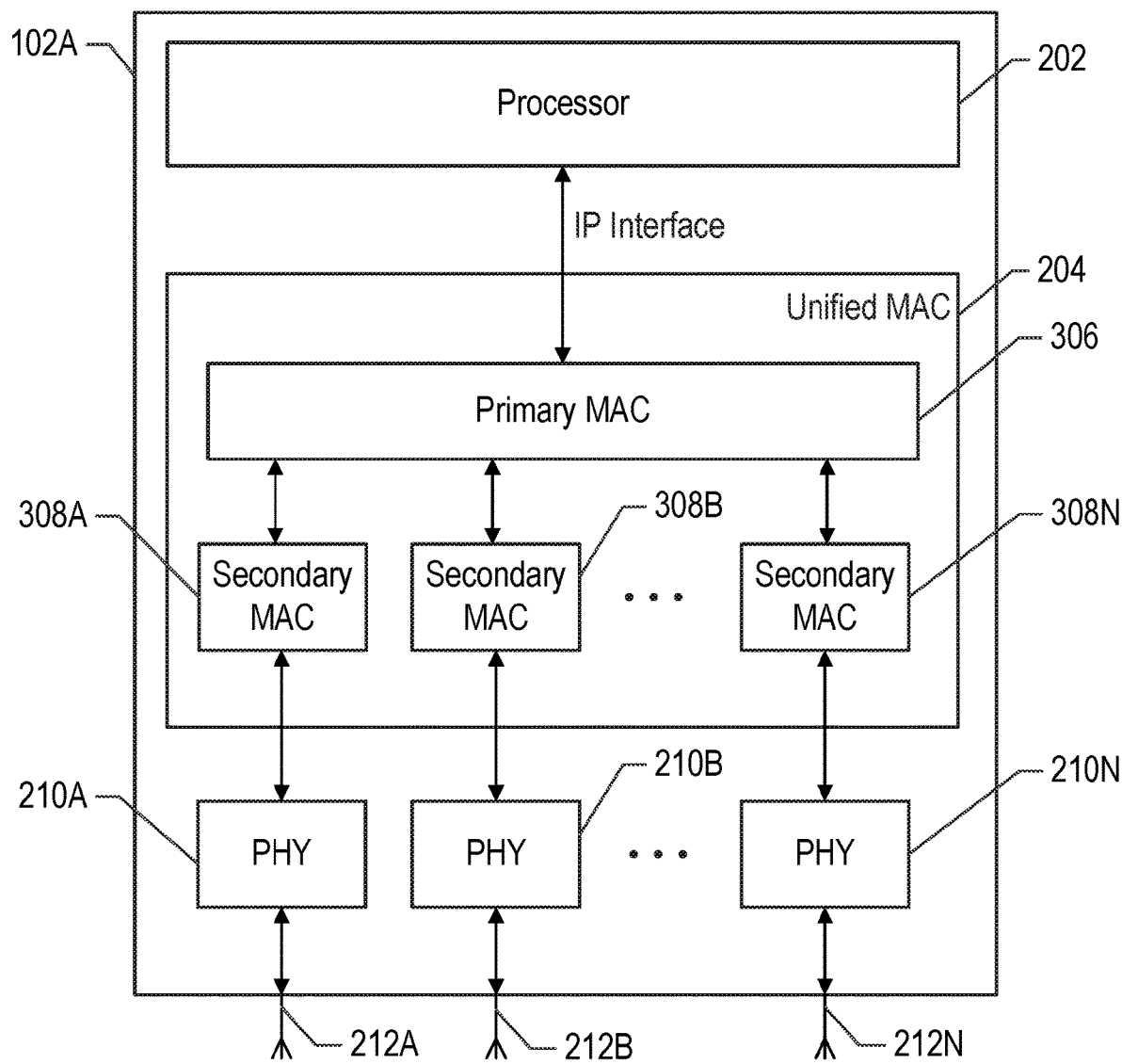
FIG. 3 illustrates an example electronic device implementing a unified MAC for multiple PHYs in accordance with one or more implementations.

FIG. 3 illustrates an example electronic device 102A implementing a unified MAC for multiple PHYs in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include, among other components, the processor 202, the unified MAC module 204, the one or more PHYs 210A-N, and the one or more antennas 212A-N. The unified MAC module 204 may include a primary MAC module 306 and one or more secondary MAC modules 308A-N. The primary MAC module 306 may be communicatively coupled to the processor 202, such as via one or more internet protocol (IP) interfaces. The primary MAC module 306 may also be communicatively coupled to each of the secondary MAC modules 308A-N. In one or more implementations, there may be a single MAC address assigned to the unified MAC module 204. Accordingly, the single MAC address is shared across the primary MAC module 306 and the secondary MAC modules 308A-N.

The primary MAC module 306 may receive data from the processor 202, select one or more of the secondary MAC modules 308A-N and associated PHYs 210A-N for transmitting the data, packetize/process the data, and provide all or part of the packetized/processed data to the selected secondary MAC modules 308A-N for transmission. The primary MAC module 306 may also receive data from the secondary MAC modules 308A-N, combine/depacketize/process the data, and provide the processed data to the processor 202. An example process of the primary MAC module 306 is discussed further below with respect to FIG. 5.

The processor 202 may provide data items, such as packets, chunks, or a raw or unformatted data stream, to the primary MAC module 306 for transmission by one or more of the PHYs 210A-N, and the processor 202 may receive data items, such as packets, chunks, or a raw or unformatted data stream, from the primary MAC module 306.

The secondary MAC modules 308A-N may each be associated with, and communicatively coupled to, one of the PHYs 210A-N. The secondary MAC modules 308A-N may handle the channel/PHY specific functions with respect to each of the PHYs 210A-N, such as channel access and/or link management with respect to respective channels over the PHYs 210A-N. The secondary MAC modules 308A-N may receive data from the primary MAC module 306 and pass the data to the PHYs 210A-N for transmission over the respective channels to one or more other electronic devices 102B-C, such as the electronic device 102C. Similarly, the secondary MAC modules 308A-N may receive data from the PHYs 210A-N and may provide the received data to the primary MAC module 306. An example process of a secondary MAC module 308A is discussed further below with respect to FIG. 6.

In one or more implementations, all or part of the unified MAC module 204 may be implemented on dedicated circuitry and/or all or part of the unified MAC module 204 may be implemented by the processor 202. The primary MAC module 306 may be implemented on a same integrated circuit as the secondary MAC modules 308A-N, or the primary MAC module 306 may be implemented on a separate integrated circuit than one or more of the secondary MAC modules 308A-N. The primary MAC module 306 and/or the secondary MAC modules 308A-N may be configured to power on/off each of the corresponding PHYs 210A-N. In one or more implementations, the unified MAC module 204 may be backwards compatible with one or more of 802.11n, 802.11ac, 802.11ax, etc., and the unified MAC module 204 may provide extended functionality.

In one or more implementations, one or more of the processor 202, the unified MAC module 204, the primary MAC module 306, the secondary MAC modules 308A-N, the PHYs 210A-N, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 4:
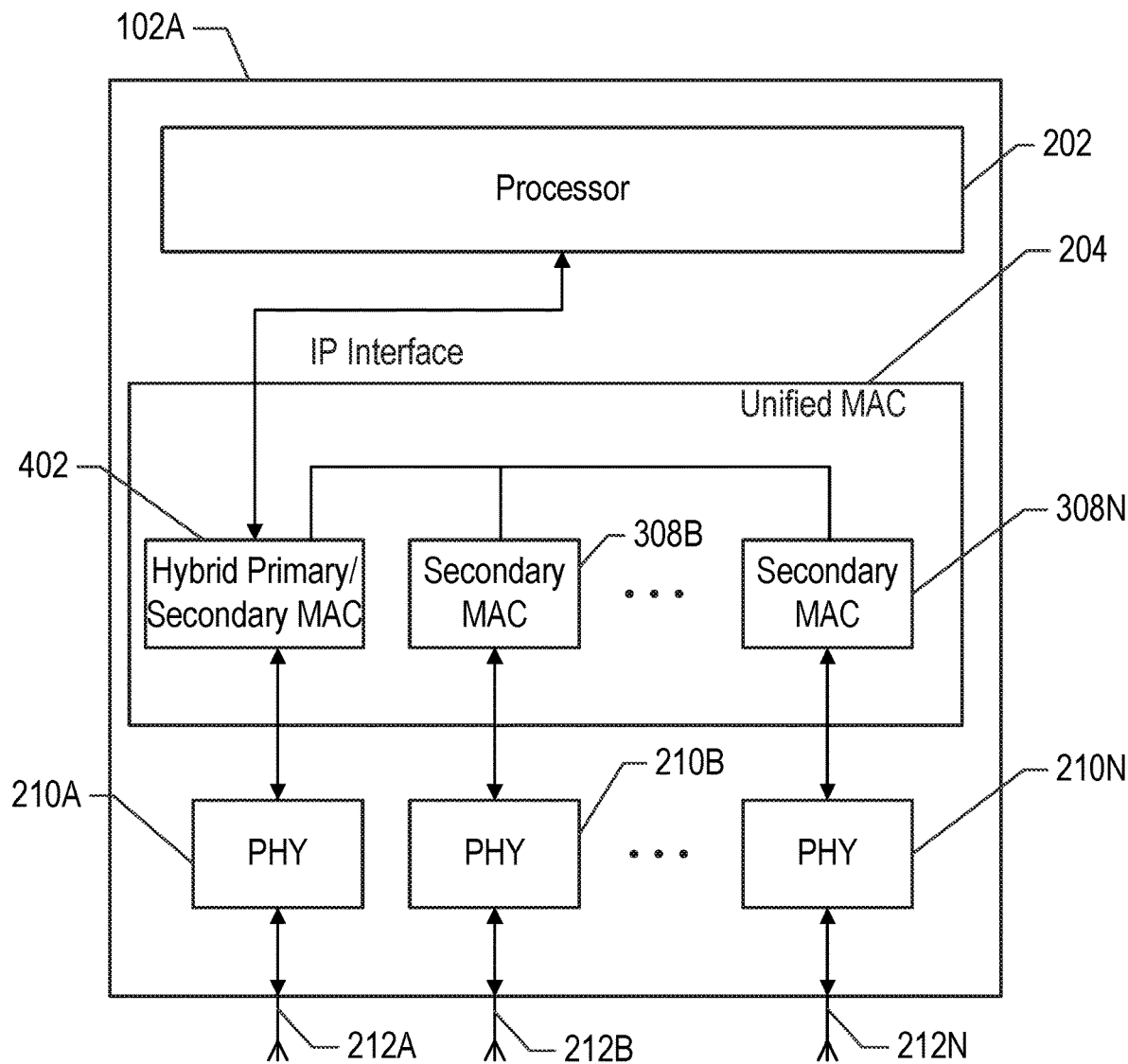
FIG. 4 illustrates an example electronic device implementing a unified MAC for multiple PHYs in accordance with one or more implementations.

FIG. 4 illustrates an example electronic device 102A implementing a unified MAC for multiple PHYs in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include, among other components, a processor 202, a unified MAC module 204, one or more PHYs 210A-N, and one or more antennas 212A-N. The unified MAC module 204 may include a hybrid primary/secondary MAC module 402 and one or more secondary MAC modules 308B-N. The hybrid primary/secondary MAC module 402 may be communicatively coupled to the processor 202, such as via one or more internet protocol (IP) interfaces. The hybrid primary/secondary MAC module 402 may also be communicatively coupled to each of the secondary MAC modules 308B-N.

The hybrid primary/secondary MAC module 402 may receive data from the processor 202, select one or more of the secondary MAC modules 308B-N (and/or itself) and associated PHYs 210A-N for transmitting the data, packetize/process the data, and provide all or part of the packetized/processed data to the selected secondary MAC modules 308B-N (and/or itself). The hybrid primary/secondary MAC module 402 may also receive data from the secondary MAC modules 308B-N (and/or the PHY 210A), combine/depacketize/process the data, and provide the processed data to the processor 202. Thus, the hybrid primary/secondary MAC module 402 may perform the functions of the primary MAC module 306 as well as the functions of the secondary MAC module 308A.

In one or more implementations, each of the secondary MAC modules 308A-N in FIG. 3 may be configurable to function as the hybrid primary/secondary MAC module 402. For example, the secondary MAC modules 308A-N may elect one of the secondary MAC modules 308A-N to function as the hybrid primary/secondary MAC module 402, the first of the secondary MAC modules 308A-N in use may become the hybrid primary/secondary MAC module 402, and/or one of the secondary MAC modules 308A-N may be selected at random to function as the hybrid primary/secondary MAC module 402, such as for a predetermined amount of time.

In one or more implementations, one or more of the processor 202, the unified MAC module 204, the hybrid primary/secondary MAC module 402, the secondary MAC modules 308B-N, the PHYs 210A-N, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 5:
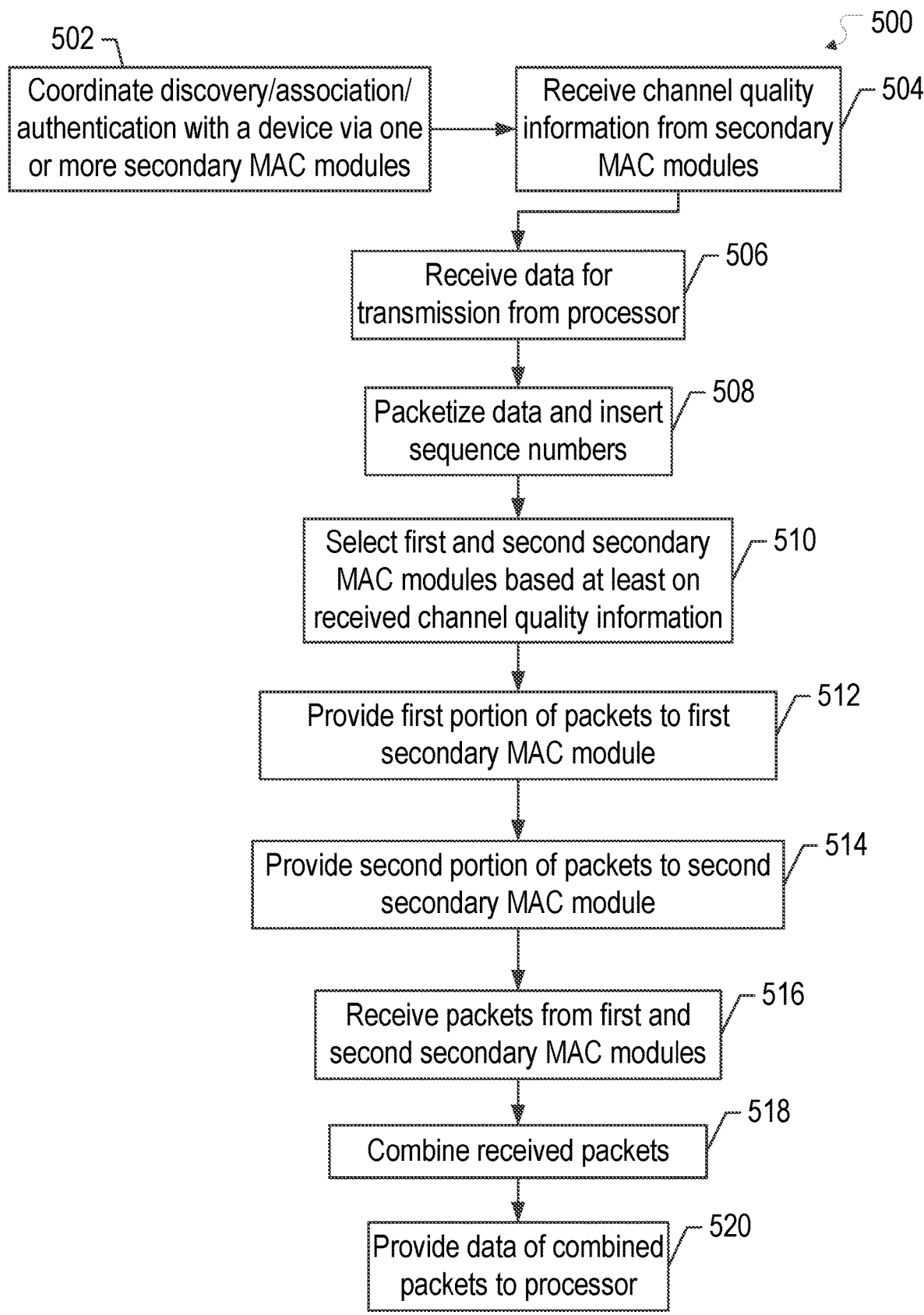
FIG. 5 illustrates a flow diagram of an example process of a primary MAC module in a unified MAC for multiple PHYs in accordance with one or more implementations.

FIG. 5 illustrates a flow diagram of an example process 500 of a primary MAC module 306 in a unified MAC for multiple PHYs in accordance with one or more implementations. For explanatory purposes, the process 500 is primarily described herein with reference to the primary MAC module 306 of the electronic device 102A of FIG. 3. However, the process 500 is not limited to the primary MAC module 306 of the electronic device 102A of FIG. 3, and one or more blocks (or operations) of the process 500 may be performed by one or more other components or chips of the electronic device 102A, and/or by the hybrid primary/secondary MAC module 402 of FIG. 4. The electronic device 102A also is presented as an exemplary device and the operations described herein may be performed by any suitable device, such as one or more of the electronic devices 102B-C. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 is initiated by the primary MAC module 306 coordinating discovery, association, and/or authentication with one or more electronic devices 102B-C, such as the electronic device 102C, via one or more of the secondary MAC modules 308A-N, such as to establish communication channels over the one or more PHYs 210A-N (502). For example, the primary MAC module 306 may coordinate security mechanisms, key exchanges, etc., with the electronic device 102C across multiple of the secondary MAC modules 308A-N and associated PHYs 210A-N. In this manner, the same security mechanisms can be reused for communication channels established with the electronic device 102C across multiple of the PHYs 210A-N, such as a 2.4 GHz PHY, a 5 GHz PHY, a 60 GHz PHY, and the like.

Once the channels are established across the secondary MAC modules 308A-N and the associated PHYs 210A-N, the primary MAC module 306 may receive link or channel quality information from the secondary MAC modules 308A-N with respect to the corresponding channels over the associated PHYs 210A-N (504). The channel quality information may include, for example, channel status information, signal strength information, and/or generally any information that may be indicative of channel quality.

The primary MAC module 306 receives data for transmission from the processor 202 (506). The data may be, for example, packets, chunks, a raw or unformatted data stream, or generally any form of data. The primary MAC module 306 packetizes the data and inserts sequences numbers into the packets (508). In this manner, the sequence numbers can be coordinated across all of the secondary MAC modules 308A-N by the primary MAC module 306. The packets may be, or may include, protocol data units (PDUs), such as MAC PDUs (MPDUs), aggregated MPDUs (A-MPDUs), and the like. The primary MAC module 306 selects first and second secondary MAC modules 308A-B for transmission of the data based at least in part on the channel/link quality information received from the secondary MAC modules 308A-N (510). For explanatory purposes, two of the secondary MAC modules 308A-N are described as being selected for transmission; however, any number of the secondary MAC modules 308A-N may be selected for transmission, such as three of the secondary MAC modules 308A-N, four of the secondary MAC modules 308A-N, or any number of the secondary MAC modules 308A-N.

The selection of the appropriate secondary MAC modules 308A-B for transmitting the data may be based on one or more factors, such as, for example, the link budget (assessed service availability) of each of the channels, wireless link quality of the channels, the amount of data to be transmitted, the power impact of the transmissions over the respective PHYs 210A-N, the availability of the channels over the respective PHYs 210A-N (e.g., as indicated by the associated secondary MAC modules 308A-N), an amount of transmission delay that can be tolerated by the data transmission, the bandwidth/throughput of the channels, and/or a quality of service associated with the data transmission.

In one or more implementations, the primary MAC module 306 may further determine whether retransmissions and/or acknowledgements should be handled by the primary MAC module 306 or the first and second secondary MAC modules 308A-B, for example, based at least in part on a quality of service associated with the data being transmitted and/or an amount of tolerable delay associated with the data being transmitted. For example, if the data transmission is associated with a high quality of service or a low amount of tolerable delay, the primary MAC module 306 may determine that the retransmissions should be handled by the secondary MAC modules 308A-N and that the acknowledgments should be transmitted by corresponding secondary MAC modules at the receiving device. In this manner, the acknowledgments and/or retransmissions can be handled with minimal delay.

However, if the quality of service associated with the data transmission is lower, and/or the amount of tolerable delay associated with the data transmission is higher, the primary MAC module 306 may determine that the acknowledgments and/or retransmissions should be handled by the primary MAC module 306. In this manner, the retransmissions and acknowledgment packets can be aggregated at the primary MAC module 306 for transmission over one or more of the secondary MAC modules 308A-N and corresponding PHYs 210A-N.

The primary MAC module 306 determines an amount of a first portion of the packets to provide to the first secondary MAC module 308A, e.g., based on the channel quality and/or throughput/bandwidth of the corresponding channel and a total amount of packets to be transmitted, and the primary MAC module 306 provides the first portion of the packets to the first secondary MAC module 308A (512). The primary MAC module 306 may provide the packets to the first secondary MAC module 308A with an indication of whether retransmissions and/or acknowledgments for the packets will be coordinated by the first secondary MAC module 308A or the primary MAC module 306 (and/or the corresponding MAC modules at the receiving device).

The primary MAC module 306 determines an amount of a first portion of the packets to provide to the second secondary MAC module 308B, e.g., based on the channel quality and/or throughput/bandwidth of the corresponding channel, and the primary MAC module 306 provides the first portion of the packets to the second secondary MAC module 308B (514). The primary MAC module 306 may provide the packets to the second secondary MAC module 308B with an indication of whether retransmissions and/or acknowledgments for the packets will be coordinated by the second secondary MAC module 308B or the primary MAC module 306 (and/or the corresponding MAC modules at the receiving device).

The primary MAC module 306 receives packets from the first and second secondary MAC modules 308A-B (516). The packets may be, for example, data packets, acknowledgment packets, retransmission requests, and the like. For example, when the retransmissions and/or acknowledgments are being handled by the primary MAC module 306, the secondary MAC modules 308A-B forward the retransmission requests and acknowledgment packets received over the corresponding PHYs 210A-B to the primary MAC module 306.

The primary MAC module 306 combines the received packets (518). For example, the primary MAC module 306 may reorder the received packets and may eliminate or drop any redundant packets. If the retransmission requests are being handled by the primary MAC module 306, and redundant data was transmitted across multiple of the secondary MAC modules 308A-B and the corresponding PHYs 210A-B, the primary MAC module 306 may compare the combined acknowledgments to the combined retransmission requests and may drop any packets requested for retransmission for which an acknowledgment packet was also received. For example, if the same packet was transmitted over two channels to another electronic device 102C, and the packet was received over one channel but not the other, the primary MAC module 306 may receive a retransmission request for the channel over which the packet was lost in addition to an acknowledgment packet for the channel over which the packet was received. Since the acknowledgment packet indicates that the packet was received by the electronic device 102C over one of the channels, the primary MAC module 306 can disregard or drop the retransmission request received over the other channel.

When the received packets are data packets, the primary MAC module 306 may perform maximum ratio combining to combine the received packets and drop the redundant packets. The primary MAC module 306 may provide the data of the combined packets to the processor 202 (520). In one or more implementations, the primary MAC module 306 may depacketize the combined packets and may provide the depacketized data to the processor 202.

Figure 6:
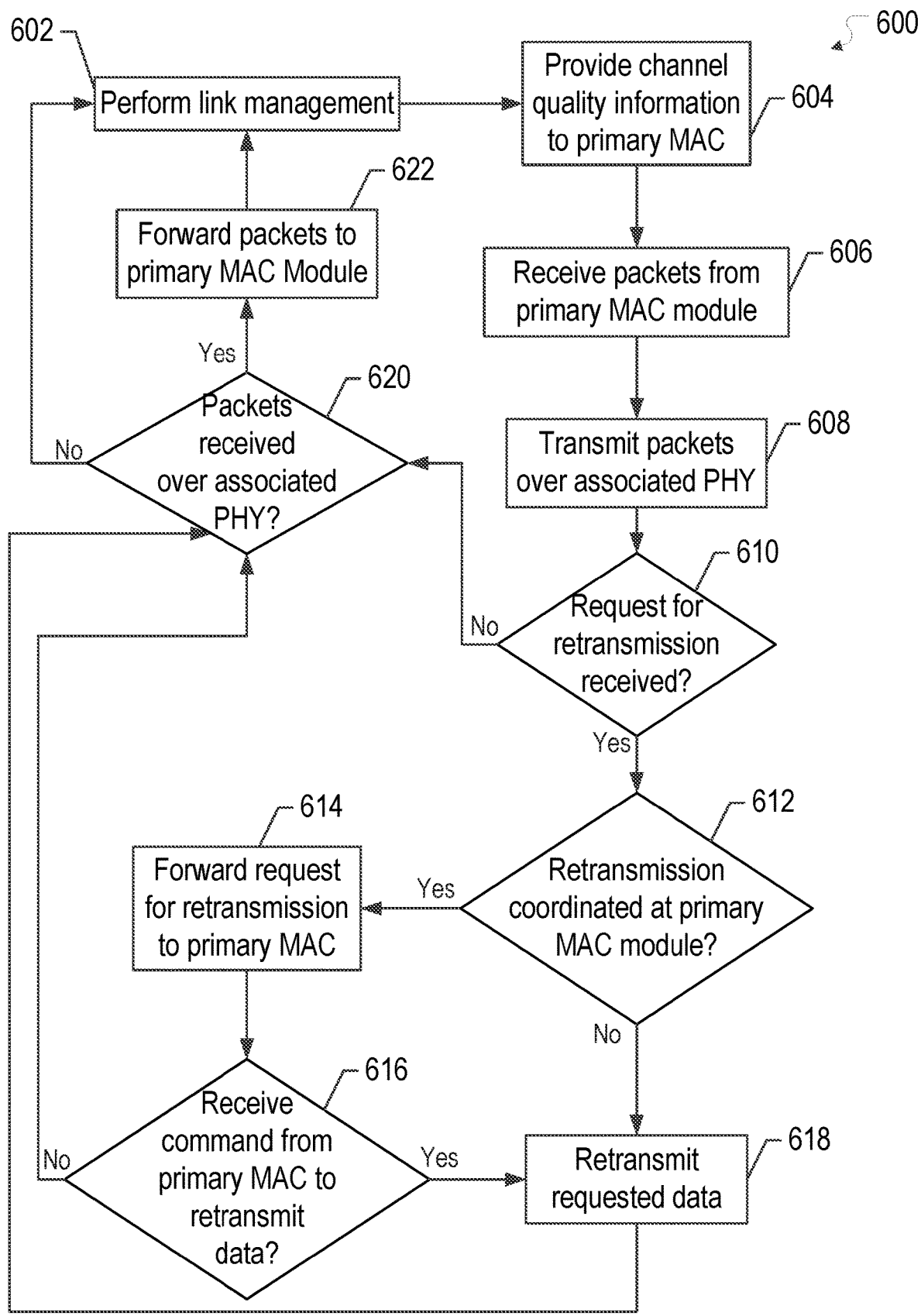
FIG. 6 illustrates a flow diagram of an example process of a secondary MAC module in a unified MAC for multiple PHYs in accordance with one or more implementations.

FIG. 6 illustrates a flow diagram of an example process 600 of a secondary MAC module 308A in a unified MAC for multiple PHYs in accordance with one or more implementations. For explanatory purposes, the process 600 is primarily described herein with reference to the secondary MAC module 308A of the electronic device 102A of FIG. 3. However, the process 600 is not limited to the secondary MAC module 308A of the electronic device 102A of FIG. 3, and one or more blocks (or operations) of the process 600 may be performed by one or more other components or chips of the electronic device 102A, by the other secondary MAC modules 308B-N of FIG. 3, and/or by the hybrid primary/secondary MAC module 402 of FIG. 4. The electronic device 102A also is presented as an exemplary device and the operations described herein may be performed by any suitable device, such as one or more of the electronic devices 102B-C. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

Once a communication channel is established over a corresponding PHY 210A, such as with the electronic device 102C, the secondary MAC module 308A performs link management procedures with respect to the communication channel over the PHY 210A (602). The secondary MAC module 308A also determines and/or receives channel quality information with respect to the channel over the PHY 210A. The channel quality information may include, for example, a signal-to-noise ratio value, a received signal strength indicator, or generally any information that may be indicative of channel quality.

The secondary MAC module 308A provides the channel quality information to the primary MAC module 306 (604). The secondary MAC module 308A may provide the channel quality information to the primary MAC module 306 on a periodic or an aperiodic basis and/or the secondary MAC module 308A may provide the channel quality information to the primary MAC module 306 responsive to a request therefor, such as when the primary MAC module 306 has received data from the processor 202 for transmission.

The secondary MAC module 308A receives packets from the primary MAC module 306 for transmission over the PHY 210A (606). In one or more implementations, the primary MAC module 306 may further indicate whether retransmission requests for the packets should be handled by the primary MAC module 306 or the secondary MAC module 308A. For example, the primary MAC module 306 may insert a value in a header of the packets indicating whether the secondary MAC module 308A should handle retransmission requests and/or the primary MAC module 306 may provide an indication separate from the transmission of the packets. If the primary MAC module 306 determines that the secondary MAC module 308A should handle retransmission requests for the packets, the primary MAC module 306 may also provide an indication in the packets, such as in the header of the packets, that acknowledgments corresponding to the packets should be transmitted by a secondary MAC module of the receiving electronic device 102C, such as to minimize the latency associated with the acknowledgments as well as the retransmissions.

The secondary MAC module 308A transmits the packets over the communication channel via the associated PHY 210A (608). The secondary MAC module 308A may perform one or more channel access procedures on the communication channel prior to transmitting the packets. For example, the secondary MAC module 308A may transmit request to send (RTS) frames over the PHY 210A and may receive clear to send (CTS) frames over the PHY 210A prior to transmitting the packets over the communication channel via the PHY 210A. In one or more implementations, the RTS/CTS frames may indicate a particular channel, frequency, and/or PHY 210A over which the data will be transmitted, and the RTS/CTS frames can be transmitted to the electronic device 102C over any of the secondary MAC modules 308A-N, e.g., not only the secondary MAC module 308A.

If a request for retransmission is received with respect to the transmitted packets (610), the secondary MAC module 308A determines whether the primary MAC module 306 indicated that retransmission should be coordinated at the primary MAC module 306 for the packets (612). If the primary MAC module 306 indicated that the retransmission requests for the packets should be coordinated by the primary MAC module 306 (612), the secondary MAC module 308A forwards the retransmission requests to the primary MAC module 306 (614).

After receiving the retransmission requests, the primary MAC module 306 may determine whether the data actually needs to be retransmitted, e.g. based on acknowledgments received over other PHYs 210B-N. If the primary MAC module 306 determines that the data needs to be retransmitted, the primary MAC module 306 determines which of the secondary MAC modules 308A-N should coordinate retransmitting the data. If the primary MAC module 306 determines that the secondary MAC module 308A should coordinate retransmitting the data, the primary MAC module 306 transmits a command (and/or the data for retransmission) to the secondary MAC module 308A. The secondary MAC module 308A receives the command or data for transmission (616) and retransmits the requested data to the electronic device 102C over the communication channel via the PHY 210A (618).

Similarly, if the primary MAC module 306 did not indicate that the retransmission requests should be coordinated by the primary MAC module 306 (612), the secondary MAC module 308A retransmits the requested data to the electronic device 102C over the communication channel via the PHY 210A (618). If the secondary MAC module 308A receives packets from the electronic device 102C over the communication channel via the PHY 210A (620), the secondary MAC module 308A forwards the packets to the primary MAC module 306 (622). If the received packets include an indication, such as in a header, that acknowledgements should be transmitted by the secondary MAC module 308A, then the secondary MAC module 308A may transmit an acknowledgment of the received packets to the electronic device 102C over the communication channel via the PHY 210A.

Figure 7:
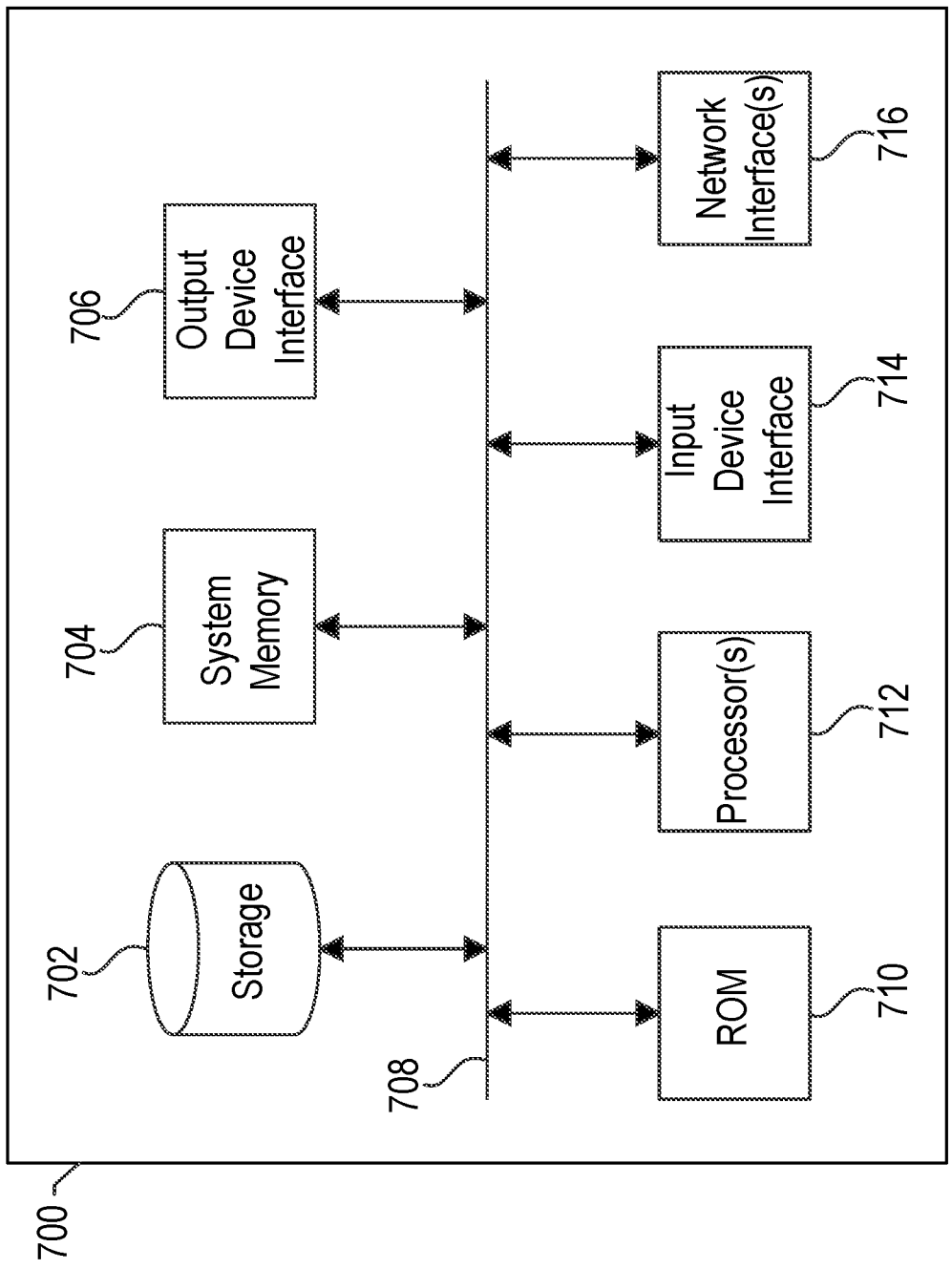
FIG. 7 conceptually illustrates an electronic system with which one or more implementations of the subject technology may be implemented.

FIG. 7 conceptually illustrates an electronic system 700 with which one or more implementations of the subject technology may be implemented. The electronic system 700, for example, may be, or may be coupled to, a gateway device, a set-top box, a desktop computer, a laptop computer, a tablet computer, a server, a switch, a router, a base station, a receiver, a phone, or generally any electronic device that transmits wired or wireless signals. The electronic system 700 can be, and/or can be a part of, one or more of the electronic devices 102A-C. Such an electronic system includes various types of computer readable media and interfaces for various other types of computer readable media. The electronic system 700 includes a bus 708, one or more processor(s) 712, a system memory 704 or buffer, a read-only memory (ROM) 710, a permanent storage device 702, an input device interface 714, an output device interface 706, and one or more network interface(s) 716, or subsets and variations thereof.

The bus 708 collectively represents all system, peripheral, and chipset buses that communicatively connect the numerous internal devices of the electronic system 700. In one or more implementations, the bus 708 communicatively connects the one or more processor(s) 712 with the ROM 710, the system memory 704, and the permanent storage device 702. From these various memory units, the one or more processor(s) 712 retrieve instructions to execute and data to process in order to execute the processes of the subject disclosure. The one or more processor(s) 712 can be a single processor or a multi-core processor in different implementations.

The ROM 710 stores static data and instructions that are needed by the one or more processor(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processor(s) 712 may need at runtime. In one or more implementations, the processes of the subject disclosure are stored in the system memory 704, the permanent storage device 702, and/or the ROM 710. From these various memory units, the one or more processor(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, the bus 708 also couples the electronic system 700 to one or more networks (not shown) through one or more network interface(s) 716. One or more network interface(s) may include an Ethernet interface, a WiFi interface, a cellular interface, a mmWave interface, a reduced gigabit media independent interface (RGMII), or generally any interface for connecting to a network. The one or more network interfaces 716 may include, or may be coupled to, a physical layer module. In this manner, the electronic system 700 can be a part of one or more networks of computers (such as a local area network ("LAN"), a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
    at least one processor communicatively coupled to first and second physical layer circuits via a media access control (MAC) module, wherein the first physical layer circuit is configured to communicate with another device over a first wireless channel, the second physical layer circuit is configured to communicate with the another device over a second wireless channel, and the MAC module is configured to:
        receive, by the MAC module, one or more first data items for transmission to a device, wherein the MAC module is configured to provide data to each of a first and second physical layer module for transmission to the device;
        select, by the MAC module, at least one of the first or second physical layer circuits for transmission of the one or more first data items to another device based at least in part on a first condition of the first wireless channel provided by the first physical layer circuit and a second condition of the second wireless channel provided by the second physical layer circuit;
        provide the one or more first data items to the selected at least one of the first or second physical layer circuits for transmission to the another device;
        receive, by the MAC module, one or more second data items from the first physical layer module, the one or more second data items having been received over the first wireless channel via the first physical layer circuit;
        receive, by the MAC module, one or more third data items from the second physical layer module, the one or more third data items having been received over the second wireless channel via the second physical layer circuit;
        combine, by the MAC module, the one or more second and third data items; and
        transmit, by the MAC module, the combined one or more second and third data items to the at least one processor.

2. The device of claim 1, wherein the MAC module is further configured to:
    provide the one or more first data items to the first and second physical layer circuits for concurrent transmission to the another device.

3. The device of claim 1, wherein the MAC module is further configured to:
    provide the one or more first data items to the selected at least one of the first or second physical layer circuits for transmission to the another device and at least one other device over one or more channels.

4. The device of claim 1, wherein the MAC module is further configured to:
    receive one or more fourth data items for transmission to the another device, the one or more fourth data items being part of a different data flow than the one or more first data items;
    provide the one or more first data items to the first physical layer circuit for transmission to the another device; and
    provide the one or more fourth data items to the second physical layer circuit for transmission to the another device.

5. The device of claim 1, wherein the MAC module is further configured to:
    provide a first portion of the one or more first data items to the first physical layer circuit for transmission to the another device; and
    provide a second portion of the one or more first data items to the second physical layer circuit for transmission to the another device.

6. The device of claim 1, wherein the MAC module is further configured to:
    perform a first channel access procedure for the first wireless channel via the first physical layer circuit and a second channel access procedure for the second wireless channel via the second physical layer circuit, the second channel access procedure differing from the first channel access procedure.

7. The device of claim 1, wherein the first wireless channel is on a different frequency that the second wireless channel.

8. A method comprising:
receiving, by a media access control (MAC) module, one or more first data items for transmission to a device, wherein the MAC module is configured to provide data to each of a first and second physical layer module for transmission to the device;
selecting, by the MAC module, at least one of the first or second physical layer modules for transmission of the one or more first data items to the device based at least in part on a first condition of a first wireless channel corresponding to the first physical layer module and a second condition of a second wireless channel corresponding to the second physical layer module;
providing the one or more first data items to the selected at least one of the first or second physical layer modules for transmission to the device;
receiving, by the MAC module, one or more second data items from the first physical layer module, the one or more second data items having been received over the first wireless channel via the first physical layer module;
receiving, by the MAC module, one or more third data items from the second physical layer module, the one or more third data items having been received over the second wireless channel via the second physical layer module;
combining, by the MAC module, the one or more second and third data items; and
transmitting, by the MAC module, the combined one or more second and third data items to a processor.

9. The method of claim 8, wherein providing the one or more first data items to the selected at least one of the first or second physical layer modules for transmission to the device further comprises:
providing a first portion of the one or more first data items to the first physical layer module for transmission to the device; and
providing a second portion of the one or more first data items to the second physical layer module for transmission to the device.

10. The method of claim 9, wherein the first portion of the one or more first data items is the same as the second portion of the one or more first data items.

11. The method of claim 8, wherein combining, by the MAC module, the second data items and the third data items further comprises:
eliminating at least one redundant data item from the one or more second and third data items.

12. The method of claim 8, wherein the first wireless channel is on a different frequency that the second wireless channel.

13. The method of claim 8, further comprising:
performing a first channel access procedure for the first wireless channel via the first physical layer module and a second channel access procedure for the second wireless channel via the second physical layer module, the second channel access procedure differing from the first channel access procedure.

14. A non-transitory machine readable medium comprising code that, when executed by one or more processors causes the one or more processors to perform operations, the code comprising:
code to receive, by a media access control (MAC) module, one or more first data items for transmission to a device, wherein the MAC module is configured to provide data to each of a first and second physical layer module for transmission to the device;
code to select, by the MAC module, at least one of a first physical layer circuit or second physical layer circuit for transmission of the one or more first data items to another device based at least in part on a first link condition of a first wireless channel corresponding to the first physical layer circuit and a second condition of a second wireless channel corresponding to the second physical layer circuit;
code to provide the one or more first data items to the selected at least one of the first or second physical layer circuits for transmission to the another device;
code to receive, by the MAC module, one or more second data items from the first physical layer module, the one or more second data items having been received over the first wireless channel via the first physical layer module;
code to receive, by the MAC module, one or more third data items from the second physical layer module, the one or more third data items having been received over the second wireless channel via the second physical layer module;
code to combine, by the MAC module, the one or more second and third data items; and
code to transmit, by the MAC module, the combined one or more second and third data items to a processor.

15. The non-transitory machine readable medium of claim 14, wherein the code further comprises:
code to provide the one or more first data items to the first and second physical layer circuits for concurrent transmission to the another device.

16. The non-transitory machine readable medium of claim 14, wherein the code further comprises:
code to provide the one or more first data items to the selected at least one of the first or second physical layer circuits for transmission to the another device and at least one other device over one or more channels.

17. The non-transitory machine readable medium of claim 14, wherein the code further comprises:
code to receive one or more fourth data items for transmission to the another device, the one or more fourth data items being part of a different data flow than the one or more first data items;
code to provide the one or more first data items to the first physical layer circuit for transmission to the another device; and
code to provide the one or more fourth data items to the second physical layer circuit for transmission to the another device.

18. The non-transitory machine readable medium of claim 14, wherein the code further comprises:
code to provide a first portion of the one or more first data items to the first physical layer circuit for transmission to the another device; and
code to provide a second portion of the one or more first data items to the second physical layer circuit for transmission to the another device.

19. The non-transitory machine readable medium of claim 14, wherein the code further comprises:
code to perform a first channel access procedure for the first wireless channel via the first physical layer circuit and a second channel access procedure for the second wireless channel via the second physical layer circuit, the second channel access procedure differing from the first channel access procedure.

20. The non-transitory machine readable medium of claim 14, wherein the first wireless channel is on a different frequency that the second wireless channel.

* * * * *